United States Patent [19]

Lindner

[11] Patent Number: 5,043,174

[45] Date of Patent: Aug. 27, 1991

[54] MEAT PROCESSING WITH LISTERIA MONOCYTOGENE RE-INOCULATION CONTROL STAGE

[75] Inventor: Richard L. Lindner, Franklin, Tenn.

[73] Assignee: Hickory Specialties, Inc., Brentwood, Tenn.

[21] Appl. No.: 611,039

[22] Filed: Nov. 8, 1990

[51] Int. Cl.⁵ .................... A23B 4/044; A23L 1/317
[52] U.S. Cl. .................................. 426/315; 426/326; 426/332; 426/646; 426/650
[58] Field of Search ............... 426/105, 135, 315, 324, 426/326, 327, 332, 646, 652, 413, 492, 650

[56] References Cited

U.S. PATENT DOCUMENTS 3,121,638  2/1964  Tauber et al. ................. 426/315 X
3,615,729 10/1971  Baker et al. .................... 426/650 X
3,672,913  6/1972  Podebradsky ................. 426/646 X
3,922,367 11/1975  Gorbatov et al. .............. 426/650 X
4,112,133  9/1978  Rao et al. ....................... 426/652 X
4,250,199  2/1981  Underwood et al. .......... 426/652 X
4,359,481 11/1982  Smits et al. .................... 426/652 X Primary Examiner—Arthur L. Corbin
Attorney, Agent, or Firm—Richard E. Jenkins

[57] ABSTRACT

A liquid smoke derivative product containing a minimum of carbonyl and phenol and having no staining index and high acidity is applied to wieners post-peeling and before packaging to inhibit Listeria monocytogene re-inoculation and to extend the shelf-life of the wieners without adversely affecting the taste and/or edibility thereof.

23 Claims, No Drawings

MEAT PROCESSING WITH LISTERIA MONOCYTOGENE RE-INOCULATION CONTROL STAGE

DESCRIPTION

1. Technical Field

The present invention relates to an improved method for meat processing incorporating a Listeria monocytogenes re-inoculation control stage.

2. Related Art

As is well known to those in the meat processing field, the treatment of foods with wood smoke for food preservation has been substantially replaced by the use of "liquid smoke" which is a solution comprising liquid reagents capable of imparting smoky hue or coloration and smoky flavor to a meat exposed to a liquid or vapor phase of the solution. The use of liquid smoke provides many advantages in meat processing including the ability to use continuous processing when smoking meat as well as more uniform smoke taste and smoke coloration to the meat products treated therewith. The use of liquid smoke in lieu of wood smoke is now quite conventional in meat processing and can be more fully appreciated with reference to representative U.S. Pat. Nos. 3,873,741; 4,250,199; and 4,298,435.

Recently, the incidence of Listeria monocytogenes in the meat processing industry has caused great concern to packers, and it is believed to be a major health threat for 1990s. This bacteria can result in sickness, and in the worst case death, to victims who eat infected meat products. Although there is probably some Listeria monocytogene bacteria on all processed meat products, the danger to the public is that the bacteria will grow and increase to an infectious dose. Although much is still unknown about the Listeria monocytogenes bacteria, it is known that liquid smoke preparations that are applied in the manufacturing of meat products such as wieners have antimicrobial activity against the bacteria, perhaps due to the fact that Listeria monocytogene bacteria grow in a pH range of 4.7 to 9.2 (with an optimum pH growth level of 7.0) and liquid smoke typically has an acidic pH between about 2 to 3.

Unfortunately, although liquid smoke application is probably quite effective during meat processing to kill Listeria monocytogene bacteria, it has recently become apparent that there is a danger that re-inoculation or re-contamination by Listeria monocytogene bacteria will occur at some point between cooking and final packaging during the meat processing sequence. Even very low levels of bacteria contamination due to re-inoculation can result in dangerously high levels of bacteria by the time the meat product has been on the store shelf for a period of time.

In an effort to address this problem, research has been conducted by the meat processing industry into the use of an application of liquid smoke directly to the meat product prior to packaging in order to prevent re-inoculation and subsequent growth of Listeria monocytogene bacteria on the packaged meat product. Thus, the bacteria is initially killed or minimized by the liquid smoke and heat treatment in the meat processing cycle and, prior to packaging, another treatment of liquid smoke is applied directly to the product surface to control the re-inoculation of the meat product with Listeria monocytogene bacteria. However, this solution to the problem is not satisfactory since meat products (for example, wieners) having an application of liquid smoke applied thereto subsequent to the conventional meat packaging process are adversely affected with respect to taste. The additional liquid smoke results in an undesirable over-enhancement of the smoky flavor of the meat product and a generally commercially unsatisfactory product. Thus, the search has continued for a solution to the problem of re-inoculation of meat products with the dangerous Listeria monocytogene pathogen which does not render the meat product substantially unedible and consequently unmarketable. Applicant after extensive research has found an unexpected and surprising solution to this major problem currently facing the meat packaging industry.

DISCLOSURE OF THE INVENTION

In accordance with the present invention, applicant provides a meat processing method with a Listeria monocytogene re-inoculation control stage which is designed specifically to control re-inoculation of processed meat prior to packaging with the bacteria which can subsequently grow to dangerously high levels by the time the meat product reaches the end of its shelf-life. The process is described herein with respect to the processing of wieners, but it is contemplated that the invention will apply equally well to other types of processed meats which are susceptible to the dangerous Listeria pathogen.

In a meat processing sequence for curing meat which includes grinding and blending selected meat, stuffing the meat into casings, applying liquid smoke to the meat, cooking the meat in a smokehouse, chilling the meat, peeling the casings from the meat, and packing the meat for shipment, the improvement comprises applying an acidic solution derived from liquid smoke to the processed meat subsequent to peeling and prior to packaging thereof in order to control Listeria monocytogene bacteria re-inoculation thereof. The liquid smoke derivative solution comprises: acetic acid in a concentration of about 6.5 to 8.0% weight per unit volume (w/v); carbonyl in a concentration of about 1.0 to 8.0% weight per unit volume (w/v); phenol in a concentration of about 0.1 to 1.0% weight per unit volume (w/v); and water in a concentration of about 83.0 to 92.4% weight per unit volume (w/v). Most suitably, the liquid smoke derivative solution is produced by processing conventional liquid smoke through an evaporator which separates and condenses the low boiling elements of the liquid smoke to produce the liquid smoke derivative solution. The remaining product from the separator is essentially a more concentrated solution of conventional liquid smoke having enhanced acidity, staining index, carbonyl level, phenol level, specific gravity, density and color.

It is therefore the object of this invention to provide an improved meat processing method which eliminates the problems associated with re-inoculation of processed meat with Listeria monocytogene bacteria prior to packaging.

It is another object of the present invention to provide an improved meat processing method which prevents re-inoculation of processed meat with Listeria monocytogene bacteria prior to packaging without adversely affecting the taste and edible quality of the processed meat.

It is yet another object of the present invention to provide an improved meat processing method for wieners which inhibits re-inoculation of the processed wieners prior to packaging with the Listeria monocytogene bacteria in order to inhibit bacteria growth and improve the shelf-life of the wieners without adversely affecting the edible quality thereof.

Some of the objects of the invention having been stated, other objects will become evident as the description proceeds below.

BEST MODE FOR CARRYING OUT THE INVENTION

Applicant has developed a unique high acid, low flavor, liquid smoke derived solution which is specifically designed to be applied in the processing of wieners subsequent to peeling and prior to packaging in order to inhibit the re-inoculation of the product with Listeria monocytogene bacteria. The liquid smoke derivative product provides a pleasing, accentuating flavor note to the wieners whereas conventional liquid smoke would provide too heavy a smoke flavor. Thus, applicant has provided a solution to one of the most critical problems facing packers in the meat industry today. Although the detailed description of the invention set forth below will be in terms of treating wieners, it should be appreciated that this is not intended as a limitation to the invention which is believed to be applicable to substantially any processed meat product that is likely to be contaminated with Listeria monocytogene bacteria during processing thereof.

Example of Wiener Processing Method

A meat processing cycle for wieners is as follows:

1. Grind selected fresh meats to be used for wieners.
2. Place all meats into a ribbon blender, add water, spices, cure, and apply liquid smoke (or alternatively, place all meats into a chopper, add water, spices, cure, and apply liquid smoke).
3. When all meats have been properly blended, process them through a single or double plate emulsifier (or alternatively, when all meats have been properly chopped, process them through either a single or double plate emulsifier).
4. Place the emulsified meat into a meat pump which will feed a TOWNSEND RT7 FRANK-A-MATIC machine.
5. The FRANK-A-MATIC machine will stuff the emulsified meat into cellulose casings (15 mm to 43 mm) and will automatically size and twist the meat into individual links whose size and weight are predetermined by casing size and machine settings. (Cellulose casings have a length from about 84 feet to 210 feet which when stuffed and sized by the FRANK-A-MATIC machine become a long stick of wieners).
6. The sticks of wieners are next:
   a. Conveyed through a SMOKE-A-MATIC machine (liquid smoke shower) for 45 to 90 seconds, depending on the desired color and flavor; or
   b. Treated with the ZESTI SMOKE process (wherein atomized liquid smoke is applied thereto); or
   c. Treated by nebulization (liquid smoke vaporized by means of atomization and heat); or
   d. Wood smoked by conventional means.
7. The sticks of wieners are then transported to:
   a. a continuous smokehouse; or
   b. a batch smokehouse where they are cooked to an internal temperature of about 155° to 165° F.
8. Sticks of wieners coming out of the continuous smokehouse go through a brine chill and fresh water shower until they reach an internal temperature of 26° to 34° F. The sticks of wieners from the batch smokehouse go through a fresh water shower and are put into a cooler until they reach an internal temperature of 25° to 34° F.
9. The sticks of wieners are delivered to a RANGER APPOLO PEELER for peeling. The temperature of the wieners is approximately 26° to 36° F. and the RANGER APPOLO PEELER peels about 100 to 150 wieners every 10 seconds by slitting and removing the cellulose casing from the wieners.
10. Rather than the wieners being conveyed directly from the peeler to packaging, applicant's invention provides a suitable apparatus between the peeler and packaging so that the wieners conveyed from the peeler pass through an apparatus which most suitably sprays the liquid smoke derivative solution onto the wieners.

Although the design of the apparatus is within the ability of one skilled in the art, applicant prefers that the machine comprise a stainless steel recirculating cabinet having a plurality of spray nozzles therein for continuously spraying wieners as they exit the peeler machine. Alternatively, applicant contemplates that other methods of application of the liquid smoke derivative solution are possible including hand-dipping, conveyor-dipping, and other means of dipping the wieners into a bath of the solution. Still other techniques for applying the solution to wieners or other processed meat would be apparent to one skilled in the art of meat processing.

11. The wieners treated with the liquid smoke derivative solution to prevent re-inoculation with the Listeria monocytogene bacteria are now suitably transported to packaging.

As noted above, the hereinbefore described process is merely illustrative of one intended application of the method of the invention and is not intended to limit the scope of the invention which is defined by the claims appended hereto.

For a better understanding of how the liquid smoke derivative solution is developed, the specifications of a representative liquid smoke (Code 10 manufactured by Hickory Specialties, Inc. of Brentwood, Tenn.) are set forth below:

| ZESTI SMOKE (Code 10) Liquid Smoke Specifications | |
|---|---|
| Acidity | 10.5–11.0 |
| Staining Index | 69–80 |
| Carbonyl Level (g/100 ml) | 15–25 |
| Phenol Level (mg/ml) | 12–22 |
| Specific Gravity @ 25° C. | 1.068–1.079 |
| Density (lbs/gal) | 8.90–8.99 |
| Benzopyrene | Less than 1 part/billion |
| pH Level | 2–3 |
| Color | Amber |

Applicant prefers to process the ZESTI SMOKE Code 10 liquid smoke product through a separator (for example, an APV evaporator) wherein the liquid smoke is fed as a feed stock which is heated and the low boiling acids thereof removed from the top of the evaporator and condensed into the liquid smoke derivative solution. The heavy, high boiling materials of the heated feed stock are removed from the bottom of the separator and serve as a high strength liquid smoke solution having higher acidity, staining index, carbonyl and phenol levels, specific gravity, density and darker color then conventional liquid smoke. This product is sold under the trademark SUPERSMOKE by Hickory Specialties, Inc. of Brentwood, Tenn. for a variety of end uses.

The liquid smoke derivative product is a low pH, low flavor, low stain product and possesses the following specifications:

| Liquid Smoke Derivative Solution Specifications | |
|---|---|
| Acidity | 6.8-7.8 |
| Staining Index | None |
| Specific Gravity | 1.005-1.015 |
| Carbonyl (g/100 ml) | 2.0-7.0 |
| Phenol (mg/ml) | 1.0-4.0 |
| Benzopyrene | Less than 1 ppb |
| pH Level | 2.0-2.4 |
| Color | Amber |

Also, applicant has analyzed the liquid smoke derivative solution and found that it comprises: acetic acid in a concentration of about 6.5 to 8.0% (preferably 6.8 to 7.8%) weight per unit volume (w/v); carbonyl in a concentration about 1.0 to 8.0% (preferably 2.0 to 7.0%) weight per unit volume (w/v); phenol in a concentration of about 0.1 to 1.0% (preferably 0.1 to 0.4%) weight per unit volume (w/v); and water in a concentration of about 83 to 92.4 (preferably 84.8 to 91.1%) weight per unit volume (w/v).

Applicant has tested the liquid smoke derivative solution in accordance with the process of the instant invention. The test protocol included obtaining fresh wieners; peeling and spraying the wieners with the liquid smoke derivative solution; inoculating the wieners with Listeria monocytogenes by dipping (high inoculum), spraying (medium inoculum) and swabbing (low inoculum); vacuum packing and storing the wieners at 40° F.; measuring the surface pH of the wieners; and rinsing wieners with diluent and plating diluent with selective agar for Listeria and non-selective agar for total aerobic bacteria. Table 1 below sets forth test results obtained when wieners were sprayed with the solution immediately after peeling and then inoculated with differing levels of Listeria monocytogene bacteria. The results are as follows:

As can be seen, whether the pathogenic bacteria is applied by dip, spray or swab, the Listeria monocytogene bacteria is reduced to very low levels over a period of time of up to 12 weeks. This test shows that the treatment of wieners post peeling and prior to packaging with the liquid smoke derivative solution will result in death or inhibition of the growth of Listeria monocytogenes. The improved meat packaging process will clearly serve to improve shelf-life of wieners by serving to inhibit the growth of any pathogenic Listeria bacteria which may be re-inoculated onto peeled wieners prior to packaging thereof during meat processing at the packaging house. Thus, the process of the instant invention serves to substantially obviate the growing concern among meat packagers of the dangers of re-inoculation of processed meat prior to packaging with Listeria monocytogene while not adversely affecting the taste or edibility of the packaged meat product. The new process improvement is easy to implement for the meat processor and is believed to be a significant advancement in the meat processing and packaging art.

It will be understood that various details of the invention may be changed without departing from the scope of the invention. Furthermore, the foregoing description if for the purpose of illustration only, and not for the purpose of limitation—the invention being defined by the claims.

What is claimed is:

1. In a process for curing meat comprising grinding and blending selected meat, stuffing the meat into casings, applying liquid smoke or wood smoke to the meat, cooking the meat in a smokehouse, chilling the meat, peeling the casings from the meat, and packing the meat for shipment, the improvement comprising: applying an acidic solution derived from liquid smoke to the meat subsequent to peeling and prior to packing to control Listeria re-inoculation thereof, said liquid smoke derivative solution comprising:

acetic acid in a concentration of about 6.5 to 8.0% weight per unit volume (w/v);

TABLE 1

| | Wieners Sprayed After Peeling With Liquid Smoke Derivative Solution | | | | | | | |
|---|---|---|---|---|---|---|---|---|
| | High level Inoculum | | Medium level Inoculum | | Low level Inoculum | | Uninoculated | |
| Time (weeks) | Listeria cfu/hd | APC cfu/hd | Listeria cfu/hd | APC cfu/hd | Listeria cfu/hd | APC cfu/hd | Listeria cfu/hd | APC cfu/hd |
| 0 | 310,000 | 660,000 | 1,200 | 4,400 | 110 | 440 | <10 | <10 |
| | 250,000 | 860,000 | 950 | 5,700 | 80 | 560 | <10 | <10 |
| | 360,000 | 690,000 | 80 | 1,800 | 20 | 350 | <10 | <10 |
| 2 | 14,000 | 27,000 | <10 | <10 | <10 | <10 | <10 | <10 |
| | 13,000 | 43,000 | <10 | 30 | <10 | <10 | <10 | <10 |
| | 16,000 | 42,000 | <10 | 40 | <10 | 10 | <10 | <10 |
| 4 | 5,200 | 46,000 | <10 | 190 | <10 | <10 | <10 | <10 |
| | 440 | 27,000 | <10 | 60 | <10 | <10 | <10 | <10 |
| | 910 | 31,000 | <10 | 20 | <10 | <10 | <10 | <10 |
| 6 | 1,900 | 48,000 | <10 | 150 | <10 | 70 | <10 | <10 |
| | 4,600 | 51,000 | 20 | 140 | <10 | 50 | <10 | <10 |
| | 660 | 31,000 | <10 | 100 | <10 | <10 | <10 | 20 |
| 8 | 4,500 | 40,000 | <10 | 250 | <10 | <10 | <10 | <10 |
| | 2,700 | 34,000 | <10 | 230 | <10 | 50 | <10 | <10 |
| | 1,000 | 36,000 | <10 | 160 | <10 | 20 | <10 | <10 |
| 10 | 1,800 | 32,000 | <10 | 1,500 | <10 | 10 | <10 | 10 |
| | 1,000 | 20,000 | <10 | 490 | <10 | 30 | <10 | 30 |
| | 60 | 2,000 | <10 | 470 | <10 | 10 | <10 | 30 |
| 12 | 1,200 | 21,000 | <10 | <10 | <10 | 40 | <10 | 20 |
| | <10 | 6,600 | <10 | 60 | <10 | 30 | <10 | 130 |
| | 700 | 31,000 | <10 | 40 | <10 | 10 | <10 | 70 |

Key:
cfu/hd = Colony Forming Units/Hot Dogs
APC = Aerobic Plate Count carbonyl in a concentration of about 1.0 to 8.0% weight per unit volume (w/v);

phenol in a concentration of about 0.1 to 1.0% weight per unit volume (w/v); and water in a concentration of about 83.0 to 92.4% weight per unit volume (w/v).

2. A process according to claim 1 wherein said liquid smoke derivative solution has a pH between about 2.0 to 2.4.

3. A process according to claim 1 wherein said liquid smoke derivative solution is produced by processing liquid smoke through an evaporator which separates and condenses the low boiling elements thereof to produce said solution.

4. A process according to claim 1 wherein said solution is sprayed onto said meat subsequent to peeling.

5. A process according to claim 1 wherein said meat is dipped into a bath of said solution subsequent to peeling.

6. A process according to claim 1 wherein said meat comprises wieners.

7. In a process for curing meat comprising grinding and blending selected meat, stuffing the meat into casings, applying liquid smoke or wood smoke to the meat, cooking the meat in a smokehouse, chilling the meat, peeling the casings from the meat, and packing the meat for shipment, the improvement comprising: applying an acidic solution derived from liquid smoke to said meat subsequent to peeling and prior to packing to control Listeria re-inoculation thereof, the liquid smoke derivative solution comprising:

acidic acid in a concentration of about 6.8 to 7.8% weight per unit volume (w/v);

carbonyl in a concentration of about 2.0 to 7.0% weight per unit volume (w/v);

phenol in a concentration of about 0.1 to 0.4% weight per unit volume (w/v); and water in a concentration of about 84.8 to 91.1% weight per unit volume (w/v).

8. A process according to claim 7 wherein said liquid smoke derivative solution has a pH between about 2.0 to 2.4.

9. A process according to claim 7 wherein said liquid smoke derivative solution is produced by processing liquid smoke through an evaporator which separates and condenses the low boiling elements thereof to produce said solution.

10. A process according to claim 7 wherein said solution is sprayed onto said meat subsequent to peeling.

11. A process according to claim 7 wherein said meat is dipped into a bath of said solution subsequent to peeling.

12. A process according to claim 7 wherein said meat comprises wieners.

13. In a process for curing meat comprising grinding and blending selected meat, stuffing the meat into casings, applying liquid smoke or wood smoke to the meat, cooking the meat in a smokehouse, chilling the meat, peeling the casings from the meat, and packing the meat for shipment, the improvement comprising: applying an acidic solution derived from liquid smoke to said meat subsequent to peeling and prior to packing to control Listeria re-inoculation thereof, the liquid smoke derivative solution having the following properties:

| Acidity | 6.8–7.8 |
| pH | 2.0–2.4 |
| Staining Index | None |
| Specific Gravity | 1.005–1.015 |
| Carbonyl (g/100 ml) | 2.0–7.0 |
| Phenol (mg/ml) | 1.0–4.0 |
| Benzopyrene | Less than 1 ppb |
| Color | Amber |

14. A process according to claim 13 wherein said liquid smoke derivative solution is produced by processing liquid smoke through an evaporator which separates and condenses the low boiling elements thereof to produce said solution.

15. A process according to claim 13 wherein said solution is sprayed onto said meat subsequent to peeling.

16. A process according to claim 13 wherein said meat is dipped into a bath of said solution subsequent to peeling.

17. A process according to claim 13 wherein said meat comprises wieners.

18. In a process for curing meat including the steps of applying liquid smoke or wood smoke to the meat, cooking the meat, and packing the meat for shipment, the improvement comprising: applying an acidic solution derived from liquid smoke to said meat subsequent to cooking and prior to packing to control Listeria re-inoculation thereof, the liquid smoke derivative solution comprising:

acetic acid in a concentration of about 6.5 to 8.0% weight per unit volume (w/v);

carbonyl in a concentration of about 1.0 to 8.0% weight per unit volume (w/v);

phenol in a concentration of about 0.1 to 1.0% weight per unit volume (w/v); and water in a concentration of about 83.0 to 92.4% weight per unit volume (w/v).

19. A process according to claim 18 wherein said liquid smoke derivative solution has a pH between about 2.0 to 2.4.

20. A process according to claim 18 wherein said liquid smoke derivative solution is produced by processing liquid smoke through an evaporator which separates and condenses the low boiling elements thereof to produce said solution.

21. A process according to claim 18 wherein said solution is sprayed onto said meat peeling to peeling.

22. A process according to claim 18 wherein said meat is dipped into a bath of said solution peeling to peeling.

23. A process according to claim 18 wherein said meat comprises wieners.

* * * * *